Figure 1:
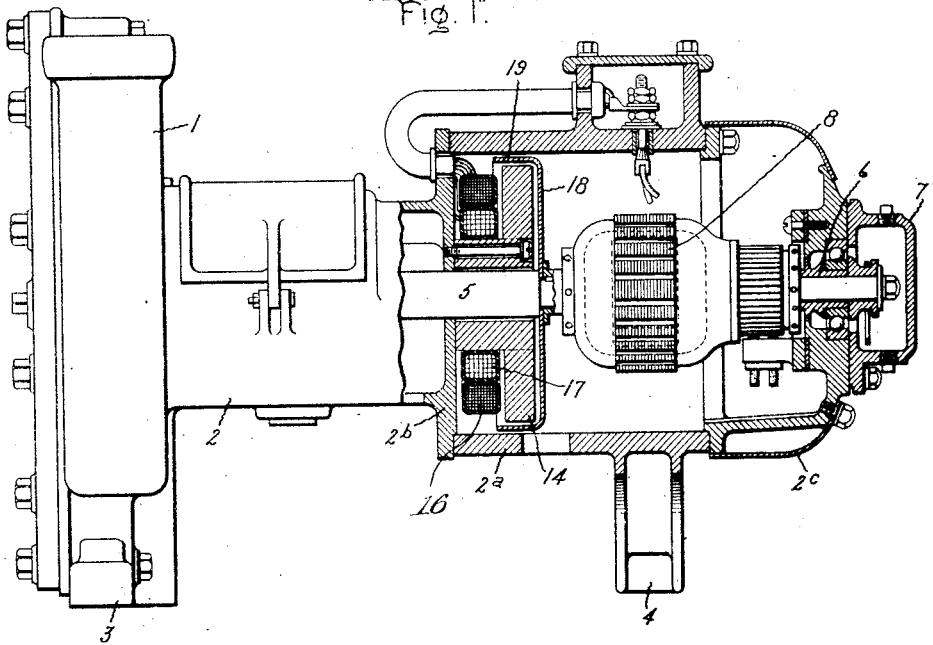

Dec. 18, 1923.                                              1,477,782
C. P. STEINMETZ ET AL
REGULATOR FOR ELECTRIC GENERATORS
Filed July 29, 1915

Inventors:
Charles P. Steinmetz,
Reginald G. Standerwick,
by *Albert G. Davis*
Their Attorney.

Patented Dec. 18, 1923.

1,477,782

UNITED STATES PATENT OFFICE.

CHARLES P. STEINMETZ, OF SCHENECTADY, NEW YORK, AND REGINALD G. STANDERWICK, OF LYNN, MASSACHUSETTS, ASSIGNORS TO GENERAL ELECTRIC COMPANY, A CORPORATION OF NEW YORK.

REGULATOR FOR ELECTRIC GENERATORS.

Application filed July 29, 1915. Serial No. 42,548.

*To all whom it may concern:*

Be it known that we, CHARLES P. STEINMETZ, a citizen of the United States, residing at Schenectady, county of Schenectady, State of New York, and REGINALD G. STANDERWICK, a subject of the King of Great Britain, residing at Lynn, county of Essex, State of Massachusetts, have invented certain new and useful Improvements in Regulators for Electric Generators, of which the following is a specification.

Our invention has reference to a system of control for an electric generator, and is particularly applicable to small turbo-generator sets such as are used for train lighting, although it will, of course, be understood that our invention is not limited in its applications to situations of this character, but is capable of general application.

Turbo-generators have heretofore been employed on locomotives for supplying the electrical energy necessary for operating electrical translating devices such as, for example, a headlight and cab lights, the turbine which operates the generator receiving steam from the locomotive boiler. In installations of this character the load is subject to considerable variation, as happens when either the cab lights or the headlight is disconnected from the circuit and when the generator and turbine are designed to supply the translating devices with current at their rated voltage at full load, then when the load is decreased the speed of the turbine and of the generator connected thereto is increased, with the result that the voltage on the lamps is increased, and this, of course, results in a short life for the lamps, and, aside from the additional expense occasioned thereby, their premature burning out is likely to occur at times when it is difficut or impossible to renew them or give them attention, and their failure is exceedingly inconvenient, and may lead to serious consequences.

It has heretofore been proposed to control the speed of the prime mover by a centrifugally operated device that regulates the amount of steam admitted to the turbine, but such devices are open to the objection that they are likely to get out of order, and are particularly objectionable for use in connection with turbo-generator sets for locomotive lighting, which are customarily mounted on the outside of the cab, where it is difficult to give them careful attention.

In accordance with our invention the voltage of the generator is maintained substantially constant by an artificial load, which is applied to the generator either when a part of the normal load is removed, or in case of overload; but under normal full load conditions, the artificial load is removed.

Our invention consists in providing an electromagnetically operated brake for the generator, provided with a magnet winding, connected in shunt to the generator and a winding connected in series therewith, which is preferably arranged, under normal full load conditions, to completely neutralize the shunt winding. The electromagnetically operated brake is therefore under the joint control of the generator voltage and of the load current. In the preferred form of our invention, the electromagnetically operated brake is of the magnetic drag type, although it will be understood that our invention is not limited thereto.

Figure 3:
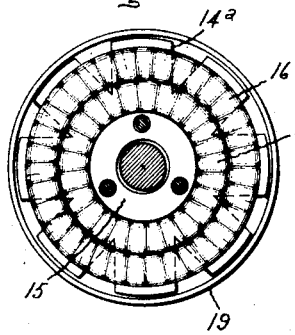
Figure 2:
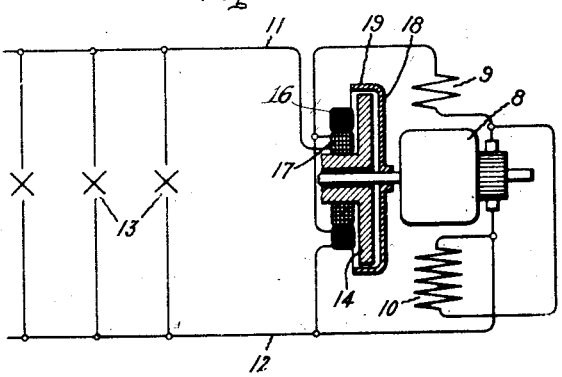

For a fuller understanding of our invention, reference may be had to the accompanying drawing, in which Figure 1 is a side view of a turbo-generator set embodying our invention and showing the generator and the electromagnetic brake therefor in vertical section; Fig. 2 is a diagrammatic view showing the circuit connections, and Fig. 3 is an end view of the electromagnetic brake shown in Fig. 1.

Referring now to the drawings, 1 is a turbine which may receive steam from the locomotive at constant pressure through a reducing valve in a well known manner. The frame 2 of the turbo-generator set is supported by legs 3 and 4. One end of the frame comprises a cylindrical portion $2^a$, which with a transverse member $2^b$ and an end piece $2^c$ constitutes a housing for the generator. The shaft 5 of the turbine is suitably journaled, as at 6, in the frame of the machine, the generator end of the shaft being enclosed by a hood 7. The armature 8 of the generator is mounted directly on the shaft 5. The generator is preferably compounded for substantially constant potential under variable load, and for this purpose is provided with a series field winding 9 and a shunt field winding 10. The particular machine illustrated is bipolar, and one of the pole-pieces is shown in dotted lines in Fig. 1. The generator is connected by supply conductors 11 and 12 to the working load 13, which usually comprises a headlight and cab-lights, and may comprise other translating devices. As shown in the drawing, the electromagnetically operated brake has a field member 14, having pole pieces 14$^a$ (see Fig. 3) extending outwardly nearly to the cylindrical member 2$^a$, which is secured by means of a hub 15 to the frame 2 of the generator. The member 14 forms, with the portion 2$^b$ of the frame, a space within which a magnetizing winding 16, connected in shunt to the generator, and a series winding 17 are received. An armature 18 of conducting material, which is preferably composed of copper in the form of a cup-shaped disc, has a flange 19 extending between the portion 2$^a$ of the frame and the poles of the field member 14, and is secured to the shaft 5.

The series coil is so designed with reference to the shunt coil as to completely neutralize the magnetic action of the shunt coil under normal full load conditions. Now, in case a part or all of the load is removed from the generator, the speed of the generator tends to increase thereby causing an increase in the voltage across the brushes of the generator and an increase in the magnetization of the shunt winding; at the same time, the current in the series coil is decreased. The shunt coil, therefore, overpowers the series coil, and sets up a magnetic drag which tends to maintain the speed of the generator substantially constant. On the other hand, in case of overload or in case of short circuit, the generator will tend to supply more current, but immediately this excessive current in the series winding causes the series coil to overpower the shunt coil, and the magnetic drag produced thereby increases with the electrical load, and tends to reduce the speed of the generator, and thus prevents it from delivering an excessive current. The result is, that under normal operating conditions the sum of the two loads, namely, the armature load plus the disc load, due to the excess of series ampere turns over shunt ampere turns, balances the power output from the turbine, and the generator is kept at substantially constant speed.

I have found it desirable so to design the shunt winding of the magnetic drag that its braking effect will slightly decrease the speed of the generator and accordingly the voltage on the supply circuit when a part or all of the load is removed, so that at the time the load is again thrown on, the voltage will be below the normal full load voltage and will gradually rise to its normal value without injury to the system. With the shunt winding thus arranged and with the series winding arranged to neutralize the effect of the shunt winding under normal full load conditions, I have found that the current in the series winding may actually be decreased when the machine is short circuited and the machine accordingly made to run cooler under short circuit conditions than under full load conditions. This is an important feature of applicants' invention, especially when it is used on locomotives where short circuits are of frequent occurrence. It will be apparent, therefore, that the series winding not only cooperates with the shunt winding to maintain the speed of the generator and the voltage on the system within the desired limits, but that the series coil also acts as a protective device against excessive currents in case of short circuit on the machine.

In accordance with the provisions of the patent statutes, we have described the principle of operation of our invention, together with the apparatus which we now consider to represent the best embodiment thereof.

It is to be understood, however, that such changes as come within the spirit and scope of the appended claims may be made.

What we claim as new and desire to secure by Letters Patent of the United States, is:—

1. In combination, an electric generator, a load circuit connected thereto, and means for limiting both the voltage and the current of the load circuit comprising an electro-magnetic brake operated by two oppositely directed fluxes responsive to the voltage and the current respectively of the load circuit and neutralizing each other under normal full load conditions.

2. In a system of control, an electric generator, a load circuit connected thereto, and means for maintaining the voltage of said generator substantially constant comprising an electromagnetically operated brake for the generator under the joint control of the generator voltage and of the load current.

3. In a system of control, an electric generator, a load circuit connected thereto, and means for maintaining the voltage of said generator substantially constant comprising an electromagnetically operated brake for the generator comprising magnet windings controlled by the generator voltage and by the load current, respectively.

4. In a system of control, a turbine to which steam under constant pressure is supplied, an electric generator connected thereto, a load circuit connected to said generator and means for maintaining the voltage of said generator substantially constant comprising an electromagnetically operated brake for the generator under the joint control of the generator voltage and of the load current.

5. In a system of control, a turbine to which steam under constant pressure is supplied, an electric generator connected thereto, a load circuit connected to said generator, and means for maintaining the voltage of said generator substantially constant comprising an electromagnetically operated brake for the generator comprising magnet windings controlled by the generator voltage and by the load current respectively.

6. In a system of control, an electric generator, and an electromagnetically operated brake therefor comprising differential magnet windings controlled by the generator voltage and by the load current, respectively, and arranged to neutralize each other under normal full load conditions.

7. In a system of control, an electric generator, a load circuit connected thereto, and a magnetic drag brake for the generator comprising a magnetizing member excited by differential windings controlled by the voltage of the generator and by the load current, respectively, and a magnetic drag member within the magnetic influence of said magnetizing member and movable with the armature of the generator.

8. In a system of control, an electric generator, a plurality of translating devices connected in parallel with the generator, and a magnetic drag brake for the generator comprising a magnetizing member including a magnetizing winding controlled by the generator voltage and a bucking winding controlled by the load current, and arranged to neutralize the magnetic effect of the first winding under normal full load conditions, and a disk of conducting material mounted upon the armature shaft within the magnetic influence of said magnetizing windings.

9. In combination, a turbine to which steam under constant pressure is supplied, a generator connected to said turbine, a variable load connected to the generator, and a magnetic drag brake for the generator comprising windings connected in series with the load and in shunt to the generator respectively, and a magnetic drag member carried by the armature shaft of said generator and within the magnetic influence of said windings.

10. A generator connected to supply energy to a variable load, means for driving said generator, a second load element normally inoperative and operable by said driving means, said second load element comprising a disk of conductive material mechanically connected to the shaft of said generator-driving means and means for creating a magnetic field through said disk, and means responsive to variations in load on said generator for varying the intensity of said magnetic field.

11. A generator connected to supply a variable load, a brake for said generator, said brake comprising means for creating a magnetic field, the magnetic field created being normally ineffective to cause braking action, and automatically operative load actuated means for rendering said magnetic field effective to cause braking action.

12. In combination, a generator, a brake associated with said generator and comprising an energizing winding, and control means responsive to variations in load on said generator and effective under normal operating conditions to insure minimum effects due to said brake energizing winding and under abnormal operating conditions to insure maximum effects due to said brake energizing winding.

13. In combination, a generator, means for driving said generator, a brake associated with said generator and comprising a disk of conductive material mechanically connected to the shaft of said generator, and a field element for creating a magnetic field to be cut by said disk, and means responsive to variations in load on said generator for varying the intensity of the magnetic field cut by said disk.

14. In combination, a generator, means for driving said generator, a brake associated with said generator and comprising a disk of conductive material and means for producing a magnetic field through said disk, and means responsive to variations in load for varying the intensity of said field.

In witness whereof, CHARLES P. STEINMETZ has hereunto set his hand this 26th day of July, and REGINALD G. STANDERWICK has hereunto set his hand this 27th day of July, 1915.

CHARLES P. STEINMETZ.
REGINALD G. STANDERWICK.